United States Patent
Vitali et al.

(10) Patent No.: US 11,119,279 B2
(45) Date of Patent: Sep. 14, 2021

(54) PHOTONIC COMPONENT

(71) Applicant: Sicoya GmbH, Berlin (DE)

(72) Inventors: Marco Vitali, Berlin (DE); Danilo Bronzi, Berlin (DE)

(73) Assignee: SICOYA GMBH, Berlin (DE)

( * ) Notice: Subject to any disclaimer, the term of this patent is extended or adjusted under 35 U.S.C. 154(b) by 15 days.

(21) Appl. No.: 16/349,576

(22) PCT Filed: Nov. 6, 2017

(86) PCT No.: PCT/DE2017/200116
§ 371 (c)(1),
(2) Date: May 13, 2019

(87) PCT Pub. No.: WO2018/091047
PCT Pub. Date: May 24, 2018

(65) Prior Publication Data
US 2020/0209482 A1 Jul. 2, 2020

(30) Foreign Application Priority Data
Nov. 21, 2016 (DE) ...................... 10 2016 222 873.0

(51) Int. Cl.
*G02B 6/34* (2006.01)
*G02B 6/42* (2006.01)
*G02F 1/21* (2006.01)

(52) U.S. Cl.
CPC .............. *G02B 6/34* (2013.01); *G02B 6/4214* (2013.01); *G02F 1/21* (2013.01); *G02F 1/212* (2021.01); *G02F 2201/58* (2013.01)

(58) Field of Classification Search
CPC ............................... G02F 1/21; G02F 2201/58
See application file for complete search history.

(56) References Cited

U.S. PATENT DOCUMENTS 10,598,859 B2 * 3/2020 Meister .............. G02B 6/12004
2001/0009594 A1   7/2001 Hosoi
(Continued)

FOREIGN PATENT DOCUMENTS

EP     1 168 039 A2   1/2002
EP     1 906 564 A1   4/2008
(Continued)

OTHER PUBLICATIONS

Yejun Fu et al., "Mach-Zehnder: A Review of Bias Control Techniques for Mach-Zehnder Modulators in Photonic Analog Links", IEEE Microwave Magazine, Nov./Dec. 2013; pp. 102-107.
(Continued)

*Primary Examiner* — Omar R Rojas
(74) *Attorney, Agent, or Firm* — Gordon Rees Scully Mansukhani, LLP

(57) ABSTRACT

The invention relates, inter alia, to a photonic component (10), which has an interference device (20), which has at least one input and at least a first and a second output. According to the invention, the component also comprises: a first grating coupler (GC1), which has a first and a second grating coupler output and is connected to the first output of the interference device by means of a grating coupler input, a second grating coupler (GC2), which has a first and a second grating coupler output and is connected to the second output of the interference device by means of a grating coupler input, a first photodetector (PD1), which is connected to the first grating coupler output of the first grating coupler, a second photodetector (PD2), which is connected to the first grating coupler output of the second grating coupler, and a control device (30), which is connected to the first and second photodetectors and, on the basis of the photo signals (I1, I2) of the two photodetectors or an evaluation signal formed by means of the photosignals, forms at least (Continued)

one control signal (ST1, ST2) for controlling the interference device, wherein the first and second grating couplers are arranged, in particular integrated, in the same chip level (E) of a chip (2000) of the component and wherein, in the case of the first and second grating couplers, the second grating coupler outputs each form a coupling path out of the chip level, namely at an angle of between 70 and 110 degrees to the chip level.

24 Claims, 13 Drawing Sheets

(56) References Cited

U.S. PATENT DOCUMENTS

| | | | |
|---|---|---|---|
| 2006/0083144 A1 | 4/2006 | Piede et al. | |
| 2006/0093362 A1* | 5/2006 | Welch | G02B 6/12026 398/87 |
| 2006/0239612 A1 | 10/2006 | De Dobbelaere et al. | |
| 2008/0080872 A1 | 4/2008 | Tanaka et al. | |
| 2010/0128336 A1 | 5/2010 | Witzens et al. | |
| 2011/0069925 A1 | 3/2011 | Zheng et al. | |
| 2011/0278441 A1 | 11/2011 | Vermeulen et al. | |
| 2015/0277207 A1 | 10/2015 | Fujikata | |
| 2015/0309261 A1 | 10/2015 | Kobyakov et al. | |
| 2016/0036550 A1 | 2/2016 | Welch | |

FOREIGN PATENT DOCUMENTS

| | | |
|---|---|---|
| EP | 2 386 890 A1 | 11/2011 |
| WO | 2016/184460 A1 | 11/2016 |

OTHER PUBLICATIONS

German Examination Report dated Jul. 25, 2017 issued in German Patent Application No. 10 2016 222 873.0; filed Nov. 21, 2016.
International Search Report dated Feb. 26, 2018 issued in PCT/DE2017/200116; filed Nov. 6, 2017.

* cited by examiner

PHOTONIC COMPONENT

The invention relates to a photonic component with an interference device having at least one input and at least one first and one second output. Such a photonic component is known for example from the US laid-open application US 2010/128336.

The invention is based on the object of specifying a photonic component with a compact construction.

This object is achieved in accordance with the invention by way of a photonic component having the features as claimed in patent claim 1. Advantageous configurations of the component according to the invention are given in the dependent claims.

Accordingly, the invention provides that the component comprises:
- a first grating coupler which has a first and a second grating coupler output and is connected, by way of a grating coupler input, to the first output of the interference device,
- a second grating coupler which has a first and a second grating coupler output and is connected, by way of a grating coupler input, to the second output of the interference device,
- a first photodetector, connected to the first grating coupler output of the first grating coupler,
- a second photodetector, connected to the first grating coupler output of the second grating coupler, and
- a control device, which is connected to the first and second photodetectors and forms at least one control signal for controlling the interference device on the basis of the photo signals of the two photodetectors or an evaluation signal formed with the photo signals,
- wherein the first and second grating couplers are arranged, in particular integrated, in the same chip plane of a chip of the component, and
- wherein, in the case of the first and second grating couplers, in each case the second grating coupler outputs form in each case a coupling path out of the chip plane, specifically at an angle between 70 and 110 degrees with respect to the chip plane.

A significant advantage of the component according to the invention can be considered that the photodetectors can be used as monitor detectors with which the optical power that is output at the second grating coupler outputs of the grating couplers can be observed. For example, it is possible by controlling the interference device to perform post-adjustment and to set the operating point in the signal paths as desired.

A further significant advantage of the component according to the invention can be considered that, owing to the use of grating couplers provided in accordance with the invention, in each case a, with respect to the chip plane, internal output coupling path is available within the chip plane and a, with respect to the chip plane, external output coupling path is available out of the chip plane. This makes it possible, for example, to couple out output signals, which are to leave the component, via the, with respect to the chip plane, external output coupling paths, and to perform the monitoring or observation of the output signals using the photodetectors by way of the, with respect to the chip plane, internal output coupling paths.

An additional considerable advantage of the component according to the invention can be considered that, owing to the arrangement of the first and second grating couplers in the same chip plane of the chip of the component, a compact construction is attainable and the manufacturing of the component is simplified, in particular becomes cost-effective.

It is advantageous if the interference device is also arranged or integrated in the chip plane of the chip.

Moreover, it is advantageous if at least one waveguide, which is arranged or integrated in the chip plane of the chip of the component,
- connects the first output of the interference device to the grating coupler input of the first grating coupler,
- connects the second output of the interference device to the grating coupler input of the second grating coupler,
- connects the first grating coupler output of the first grating coupler to the first photodetector, or
- connects the first grating coupler output of the second grating coupler to the second photodetector.

The first and second photodetectors and the first and second grating couplers are preferably arranged in each case in the same chip plane of the chip of the component, in particular integrated therein (preferably monolithically).

In an alternative configuration of the component, at least one of the photodetectors is or both photodetectors are arranged outside the chip plane of the chip.

In the latter embodiment, it is advantageous if a further coupler is arranged between the photodetector that is arranged outside the chip plane of the chip and the grating coupler that is connected thereto, in particular a further coupler which is arranged in the chip plane and whose coupler output forms a coupling path out of the chip plane, specifically at an angle between 70 and 110 degrees with respect to the chip plane.

The component can have an adder which forms a sum signal, as an evaluation signal, by adding up the two photo signals; the sum signal can be used by the control device for controlling the interference device.

The component can also include a subtractor which forms, as an evaluation signal, a difference signal by subtracting one of the two photo signals from the other of the two photo signals; the difference signal can be used by the control device for controlling the interference device.

The interference device preferably includes at least one Mach-Zehnder modulator.

In terms of the configuration of the Mach-Zehnder modulator, it is considered to be advantageous if it includes, on the input side, a 2×2 directional coupler having two inputs and two outputs, or a 1×2 splitter having one input and two outputs, the input of the input-side 1×2 splitter or the two inputs of the input-side directional coupler form the input or the two inputs of the interference device or are at least connected thereto, in each case one waveguide is connected to the two outputs of the input-side directional coupler or 1×2 splitter, of which at least one is provided with a phase modulator that is controlled by the control device.

The Mach-Zehnder modulator preferably has, on the output side, a 2×2 directional coupler having two inputs and two outputs.

The two waveguides are preferably connected to the two inputs of the output-side directional coupler, and the two outputs of the output-side directional coupler preferably form the outputs of the interference device or are preferably at least connected thereto.

It is also advantageous if the interference device includes two or at least two Mach-Zehnder modulators.

The Mach-Zehnder modulators are optically connected in parallel preferably by means of an input-side power splitter, in particular an input-side 1×2 splitter or an input-side 2×2 directional coupler, and by means of an output-side power splitter, in particular an output-side 2×2 directional coupler.

Alternatively or additionally, the interference device can include a ring resonator.

In the variant mentioned last, it is advantageous if the interference device has at least two couplers, which are in each case formed by a section of the ring resonator and a waveguide that is adjacent to the respective section, wherein the at least one input of the interference device or at least one of the inputs of the interference device is coupled to the ring resonator via one of the at least two couplers, the first output of the interference device is coupled to the ring resonator via said one of the at least two couplers or another one of the at least two couplers, and the second output of the interference device is coupled to the ring resonator via said one of the at least two couplers or another of the at least two couplers.

It is also advantageous if at least one attenuating element is connected into the signal path between the first output of the interference device and the first photodetector, or into the signal path between the second output of the interference device and the second photodetector.

The attenuating element is preferably settable. It is preferably connected to the control device and is controlled thereby.

It is particularly advantageous if the control device controls the interference device and the attenuating element such that an optical signal, which exits at the second grating coupler output of the first grating coupler and is at least also amplitude-modulated by the interference device, attains a specified on-off ratio.

Alternatively or additionally, the control device can set the attenuating element advantageously such that the optical path attenuation in the signal path between the first output of the interference device and the first photodetector and the optical path attenuation in the signal path between the second output of the interference device and the second photodetector are of the same magnitude or at least deviate from one another by less than a specified extent.

The attenuating element preferably has a charge carrier injection structure, in particular a p-n or pin diode structure for charge carrier injection.

The optical signal path between the first output of the interference device and the first photodetector and the optical signal path between the second output of the interference device and the second photodetector are preferably axisymmetric with respect to one another, so that they influence the signal properties identically or at least in a highly similar fashion.

In view of the signal flow, it is considered to be advantageous if the signal path between the first output of the interference device and the first photodetector and the signal path between the second output of the interference device and the second photodetector have the same path attenuation, in particular consist of elements of the same construction, which are identical or symmetric with respect to one another.

In the chip plane, the maximum distance between the first signal path, which is formed between the first output of the interference device and the first photodetector, and the second signal path, which is formed between the second output of the interference device and the second photodetector, is preferably less than 100 µm.

The control device is integrated preferably monolithically in the chip.

The first and second grating couplers preferably have the same construction.

The second grating coupler output of the first and/or second grating coupler preferably forms an optical signal output of the photonic component.

The invention additionally relates to a method for operating a photonic component, as it was described above. Operation preferably takes place as has already been explained in detail above.

BRIEF DESCRIPTION OF THE DRAWINGS

The invention will be explained in more detail below with reference to exemplary embodiments; in the figures, by way of example.

For the sake of clarity, the same reference signs are used throughout the figures for identical or comparable components.

DETAILED DESCRIPTION

Figure 1:
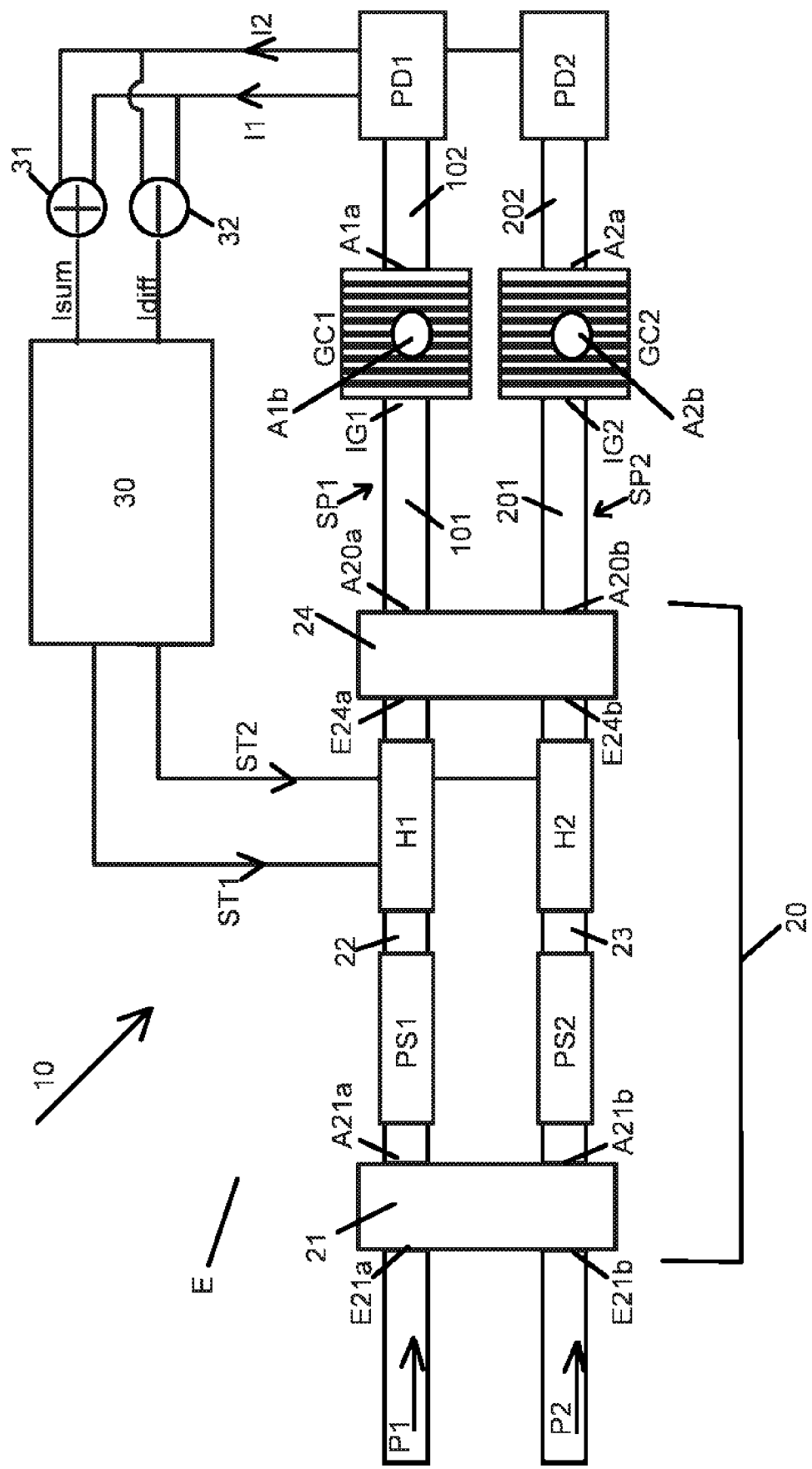
FIG. 1 shows an exemplary embodiment of a component according to the invention, in which an interference device, two grating couplers, two photodetectors and waveguides are integrated in the same chip plane of a chip of the component.

FIG. 1 shows a photonic component 10, which has an interference device 20 on the input side. A first signal path SP1, comprising a first grating coupler GC1, a first photodetector PD1 and two waveguides 101 and 102, is connected to a first output A20a of the interference device 20. The waveguide 101 connects the first output A20a of the interference device 20 to a grating coupler input IG1 of the first grating coupler GC1. The waveguide 102 connects a first grating coupler output A1a of the first grating coupler GC1 to the first photodetector PD1.

The first grating coupler GC1 moreover includes a second grating coupler output A1b, which forms a coupling path out of the image plane of FIG. 1, specifically at an angle between 70° and 110° with respect to the image plane. The image plane in FIG. 1 is formed by a chip plane E of a chip of the photonic component 10.

A second signal path SP2, including a second grating coupler GC2 and a second photodetector PD2, is connected to a second output A20b of the interference device 20. Moreover, two waveguides 201 and 202 are present, of which one, specifically waveguide 201, connects the second output A20b of the interference device 20 to the grating coupler input IG2 of the second grating coupler GC2, and the other waveguide 202 connects a first grating coupler output A2a of the second grating coupler GC2 to the second photodetector PD2.

A second grating coupler output A2b of the second grating coupler GC2 forms a coupling path out of the chip plane E of the chip of the photonic component 10, specifically at an angle between 70° and 110° with respect to the chip plane E or the image plane in FIG. 1.

The interference device 20 comprises an input-side 2×2 directional coupler 21 having two inputs E21a and E21b and two outputs A21a and A21b. The two inputs E21a and E21b of the input-side directional coupler 21 form the inputs of the interference device 20.

In each case one waveguide 22 and 23, respectively, is connected to the two outputs A21a and A21b of the input-side directional coupler 21. The two waveguides 22 and 23 connect the input-side directional coupler 21 to inputs E24a and E24b of an output-side directional coupler 24. The outputs of the output-side directional coupler 24 form the outputs A20a and A20b of the interference device 20.

The two waveguides 22 and 23 are in each case provided with a phase modulator or phase shifter H1 and H2, respectively. Controlling of the two phase shifters H1 and H2 is accomplished by way of control signals ST1 and ST2, which are produced by a control device 30. The control device 30 is connected, on the input side, to the two photodetectors PD1 and PD2 and evaluates their photocurrents or photo signals I1 and I2 or alternatively evaluation signals which are formed with the photo signals I1 and I2. In the exemplary embodiment according to FIG. 1, an adder 31 and a subtractor 32, which process the photo signals I1 and I2 of the two photodetectors PD1 and PD2 and produce, as evaluation signals, a sum signal Isum and a difference signal Idiff, are arranged upstream of the control device 30.

The control device 30 is embodied such that it produces the control signals ST1 and ST2 such that the reception powers in the two photodetectors PD1 and PD2 and consequently the photocurrents or photo signals 11 and 12 thereof are of the same magnitude.

In order to be able moreover to modulate, on the input side, optical signals P1 and P2 which have been fed into the photonic component 10 in terms of amplitude and/or phase, the component 10 includes two modulators PS1 and PS2, which are integrated in the exemplary embodiment of FIG. 1 in the waveguides 22 and 23 of the interference device 20.

The two modulators PS1 and PS2 can be controlled by the control device 30 or another device, which is not shown in FIG. 1 for reasons of clarity.

In the exemplary embodiment in accordance with FIG. 1, the interference device 20, the two grating couplers GC1 and GC2, the two photodetectors PD1 and PD2, the waveguides 101, 102, 201 and 202, the adder 31, the subtractor 32 and the control device 30 are integrated in the same chip plane E, which is formed in FIG. 1 by the image plane of FIG. 1, of a chip of the photonic component 10, preferably monolithically integrated. The chip is preferably a silicon chip, in particular based on SOI material.

In the construction of the component 10 shown in FIG. 1, the two grating couplers GC1 and GC2 each form a, with respect to the chip plane, internal output coupling path which is connected to the waveguides 102 and 202 and, by way of the latter, to the photodetectors PD1 and PD2, and a, with respect to the chip plane, external output coupling path which couples electromagnetic radiation out of the chip plane E. This construction makes it possible, for example, to couple out output signals, which are to leave the component 10, via the, with respect to the chip plane, external output coupling paths and to perform the monitoring of the output signals using the photodetectors PD1 and PD2 within the chip plane by way of the, with respect to the chip plane, internal output coupling paths.

Figure 2:
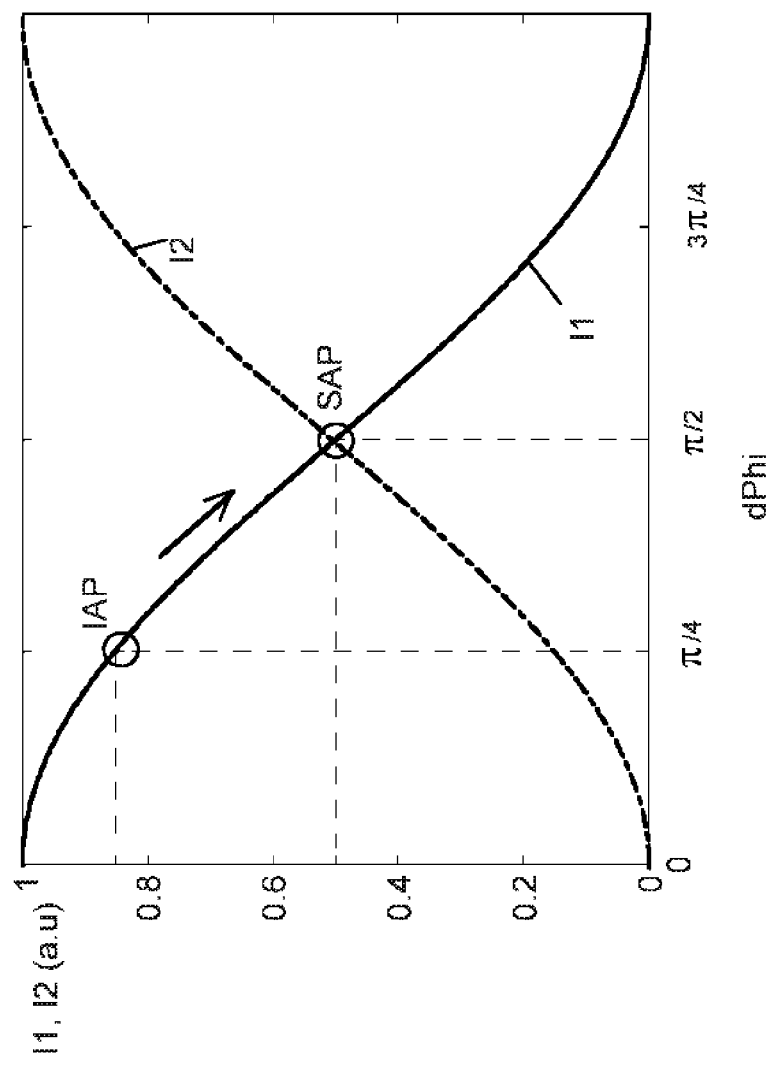
FIG. 2 shows the operating mode of the interference device 20 in the case of the photonic component of FIG. 1.

FIG. 2 shows, by way of example, the operating mode of the control device 30. It is apparent that the control device 30 produces the control signals ST1 and ST2 such that the reception power in the case of the two photodetectors PD1 and PD2 and consequently the photo signals I1 and I2 thereof become the same size, that is to say the photo signals I1 and I2 in each case make up 50% of the signal sum obtained when adding both photo signals. Such a power distribution can be achieved by using the phase shifters H1 and H2 to set a phase difference dPhi of $\pi/2$ (see FIG. 2) between the waveguides 22 and 23, that is to say the signal path between the output A21a and the input E24a and the signal path between the output A21b and the input E24b.

FIG. 2 shows, by way of example, how, in the case of a deviation of the actual operating point—here referred to as the instantaneous operating point IAP—from the mentioned target operating point SAP, in which the power distribution over the two photodetectors PD1 and PD2 is 50% in each case, the control device 30 adjusts the two phase shifters H1 and H2 such that, due to a corrected phase shift dPhi between the waveguides 22 and 23, the respective instantaneous operating point IAP is shifted to the target operating point SAP.

Figure 3:
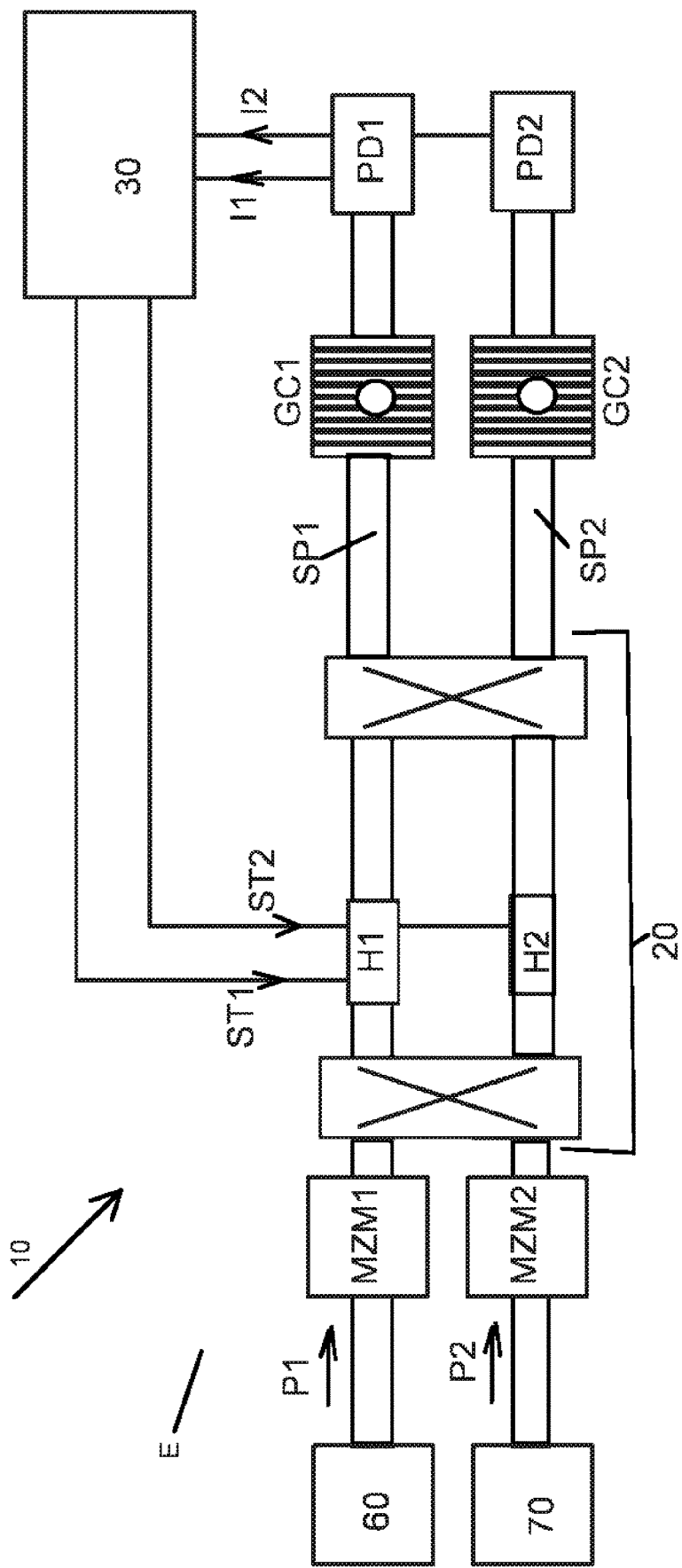
FIG. 3 shows an exemplary embodiment of a component according to the invention, in which two Mach-Zehnder interferometer modulators are arranged upstream of an interference device.

FIG. 3 shows a further exemplary embodiment of a photonic component 10, in which an interference device 20, two grating couplers GC1 and GC2, two photodetectors PD1 and PD2 and a control device 30 are present. In contrast to the exemplary embodiment of FIG. 1, double Mach-Zehnder modulators MZM1 and MZM2 are present, which perform amplitude modulation of the photo signals P1 and P2 produced by two emitters 60 and 70 before they are fed into the interference device 20.

In the exemplary embodiment according to FIG. 3, the interference device 20, the two grating couplers GC1 and GC2, the two photodetectors PD1 and PD2, the control device 30 and the emitters 60 and 70 are integrated in the same chip plane E of the component 10. The two emitters 60 and 70 can be integrated in hybrid fashion or monolithically.

Figure 4:
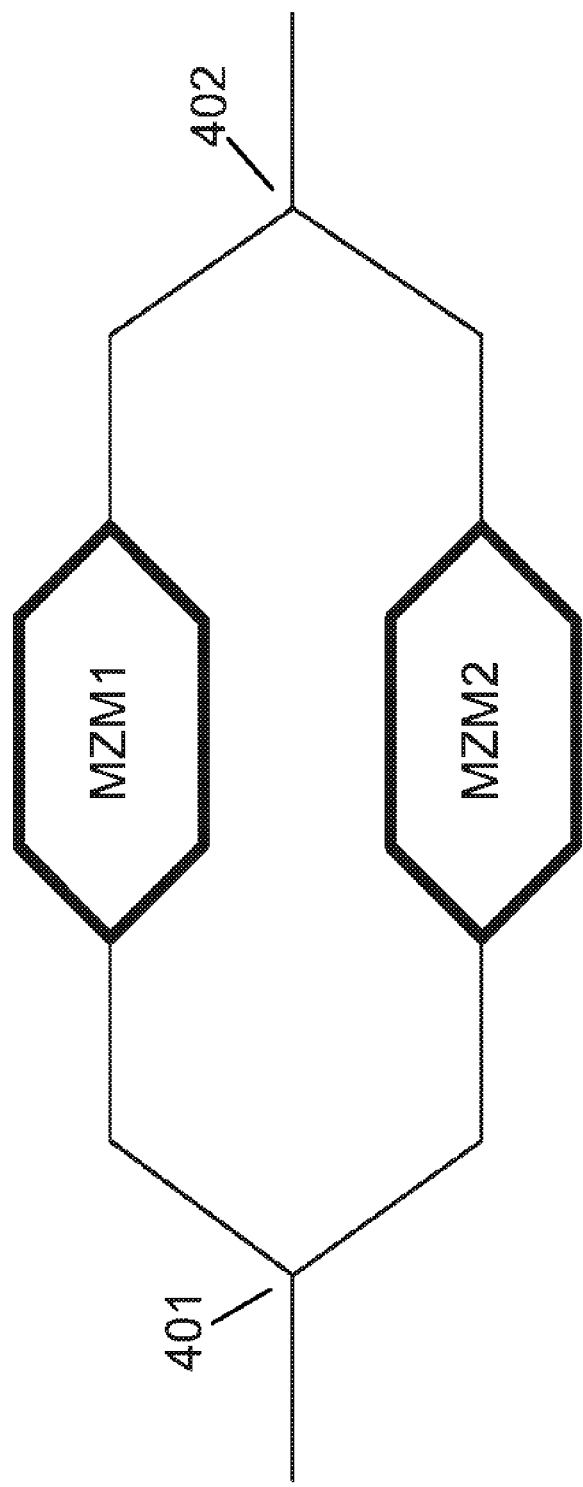
FIG. 4 shows an exemplary embodiment of an optical waveguide structure, which can additionally be used in the interference devices of the photonic components of FIGS. 1 and 3.

FIG. 4 shows an exemplary embodiment of an arrangement of two Mach-Zehnder modulators MZM1 and MZM2, which are optically connected in parallel by means of an input-side power splitter 401 and an output-side power splitter 402. The parallel connection of the two Mach-Zehnder modulators MZM1 and MZM2 can be integrated in the interference devices 20 of FIGS. 1 and 3, for example if the optical component 10 is to form a QPSK transmitter.

The Mach-Zehnder modulators MZM1 and MZM2 are preferably controlled by the control device 30 of FIG. 1 and FIG. 3.

Figure 5:
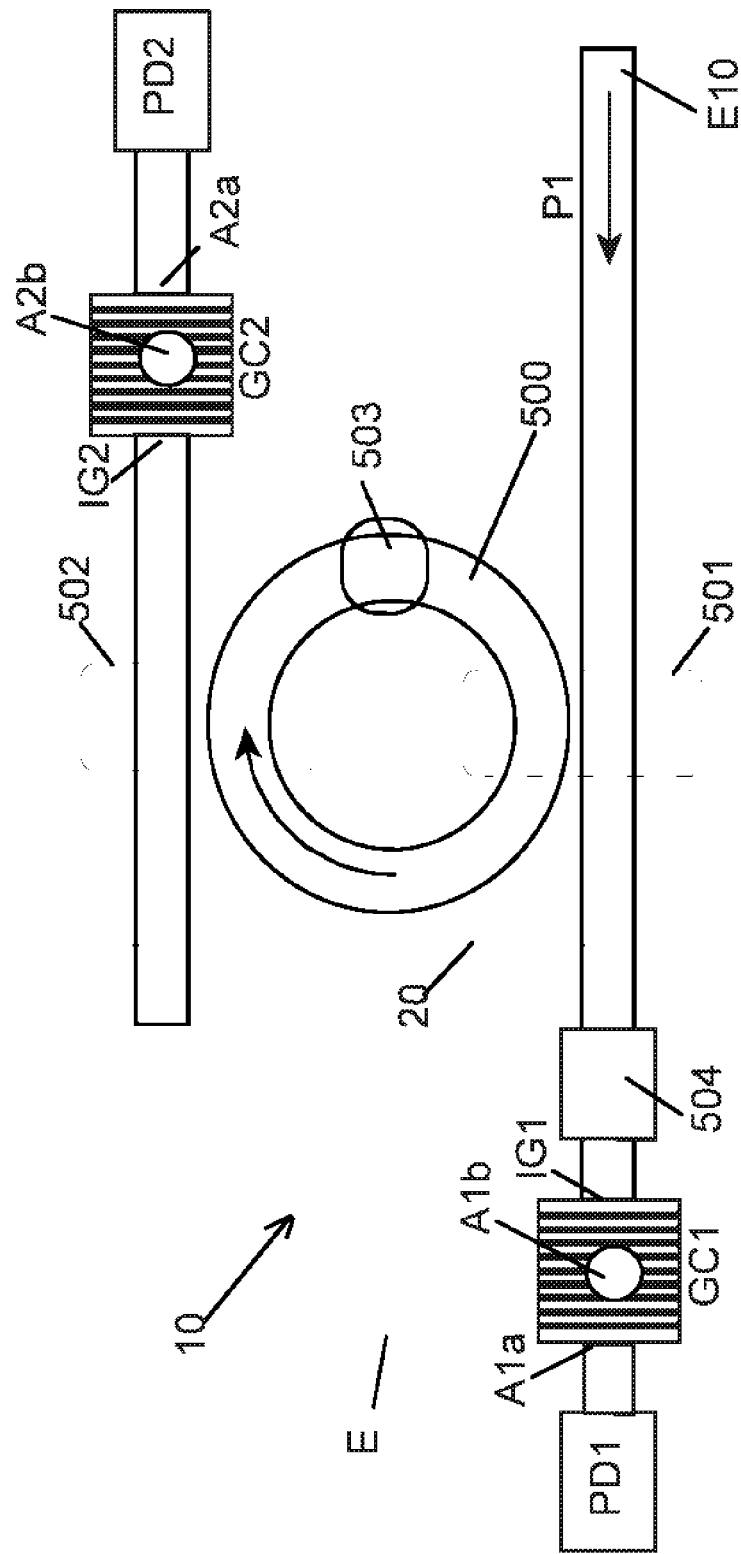
FIG. 5 shows an exemplary embodiment of a photonic component, in which an interference device comprises a ring resonator.

FIG. 5 shows a further exemplary embodiment of a photonic component 10, which is provided with an interference device 20, two grating couplers GC1 and GC2 and two photodetectors PD1 and PD2. The two photodetectors PD1 and PD2 transmit their photo signals to a control device, which, for reasons of clarity, is not illustrated further in FIG. 5 and performs control of the interference device 20.

The two grating couplers GC1 and GC2 each have a grating coupler input IG1 and IG2, two first grating coupler outputs A1a and A2a, and two second grating coupler outputs A1b and A2b.

The coupling paths formed by the two first grating coupler outputs A1a and A2a of the two grating couplers GC1 and GC2 are situated in one and the same chip plane E of a chip of the photonic component 10, that is to say in the image plane according to FIG. 5.

The coupling paths formed by the second grating coupler outputs A1b and A2b of the two grating couplers GC1 and GC2 are at an angle of between 70° and 110° with respect to the chip plane E or the image plane in FIG. 5. In other words, optical radiation that is coupled out by way of the grating coupler outputs A1b and A2b is coupled out of the image plane in FIG. 5 in the direction of the viewer.

The interference device 20 in the exemplary embodiment of FIG. 5 includes a ring resonator 500, which is coupled to a signal input E10 of the photonic component 10 and the first grating coupler GC1 via a first coupler 501 and to the first photodetector PD1 via the former.

A second coupler 502 of the interference device 20 couples the ring resonator 500 to the second grating coupler GC2 and thereby to the second photodetector PD2.

The ring resonator 500 can be equipped with a phase modulator 503, which is controlled by a control device of the component 10 (not illustrated in more detail). The phase modulator 503 is controlled by the control device preferably such that the two photodetectors PD1 and PD2 can in each case receive a specified reception power ratio with respect to the power of the input signal P1 at the input E10. With respect to controlling the phase modulator 503 or the interference device 20, reference is made to the above statements in connection with FIGS. 1 to 3, which here apply correspondingly.

Alternatively to the phase modulator 503 or in addition thereto, a settable attenuating element 504 can be provided between the first grating coupler GC1 and the first coupler 501 in order to obtain, by setting an additional attenuation, the desired ratio of the reception powers at the two photodetectors PD1 and PD2.

Figure 6:
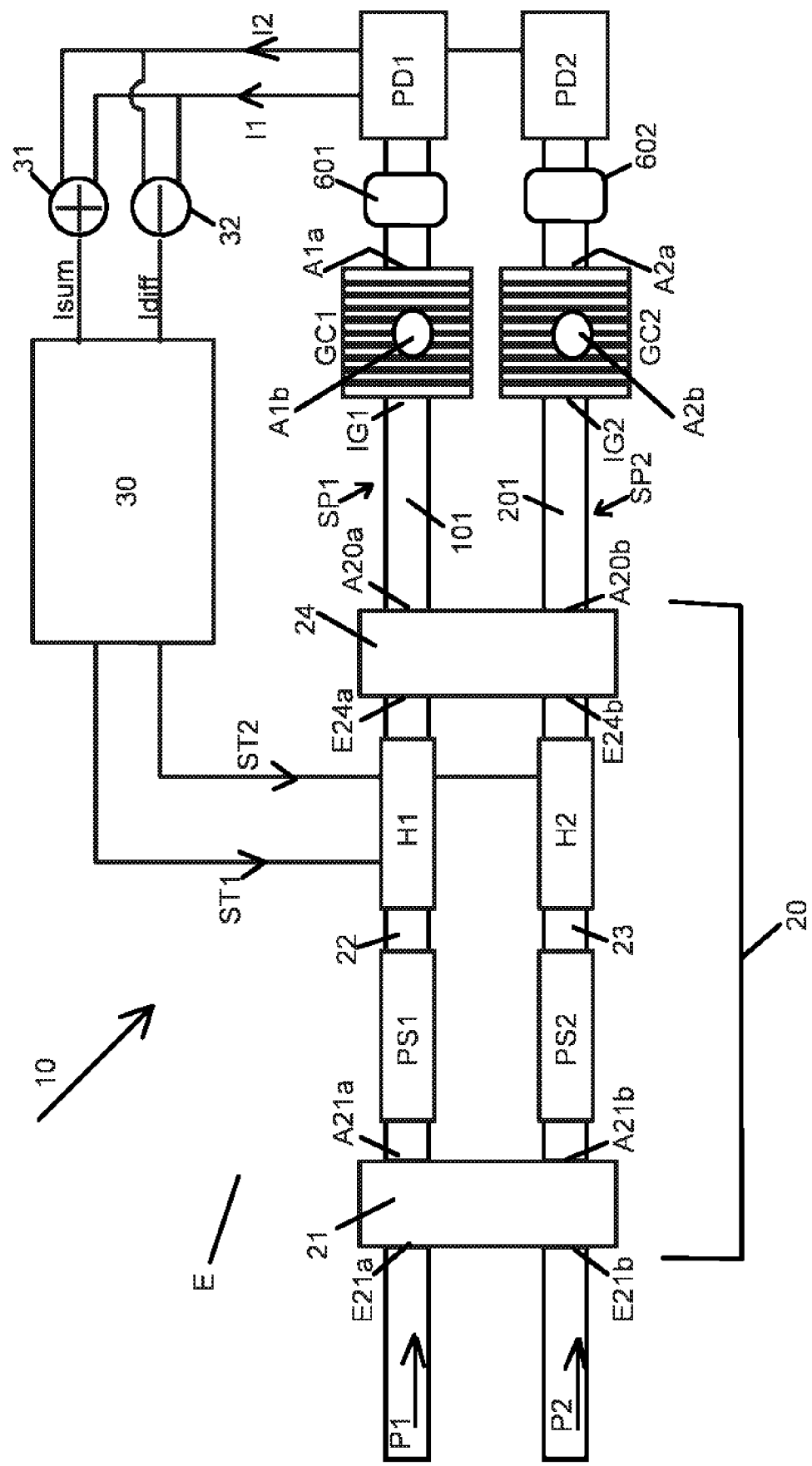
FIG. 6 shows an exemplary embodiment of a photonic component, in which in each case an attenuating element is provided between grating couplers and photodetectors.

FIG. 6 shows an alternative configuration of the photonic component 10 according to FIG. 1. It is apparent that in each case one attenuating element 601 and 602, respectively, is connected between the two grating couplers GC1 and GC2 and the respectively assigned photodetectors PD1 and PD2. The attenuating elements 601 and 602 are controlled by the control device 30. The controlling of the attenuating elements 601 and 602 makes it possible to even further change or set the operating point of the component 10 than is possible in the exemplary embodiments of FIG. 1 and FIG. 2. For example, it is apparent in FIG. 7 that controlling of the attenuating element 602 in the signal path SP2 can shift the photo signal I2 of the second photodetector PD2 (see shifted photo signal I2'), such that, associated therewith, the target operating point SAP, which would also result without active attenuation, can be changed to a new target operating point SAP'.

For example, it is possible for the control device 30 to control the interference device 20 and one of the attenuating elements 601 and 602, or both, such that an optical signal, which exits at the second grating coupler output A1b of the first grating coupler GC1 and is at least also amplitude-modulated by the interference device 20 or another device which is arranged upstream or downstream, achieves a specified on-off ratio.

Alternatively or additionally, the control device 30 can set one of the attenuating elements 601 and 602, or both, such that the optical path attenuation in the signal path SP1 between the first output A20a of the interference device 20 and the first photodetector PD1 and the optical path attenuation in the signal path SP2 between the second output A20b of the interference device 20 and the second photodetector PD2 are of the same magnitude or at least deviate from one another by less than a specified extent.

Figure 8:
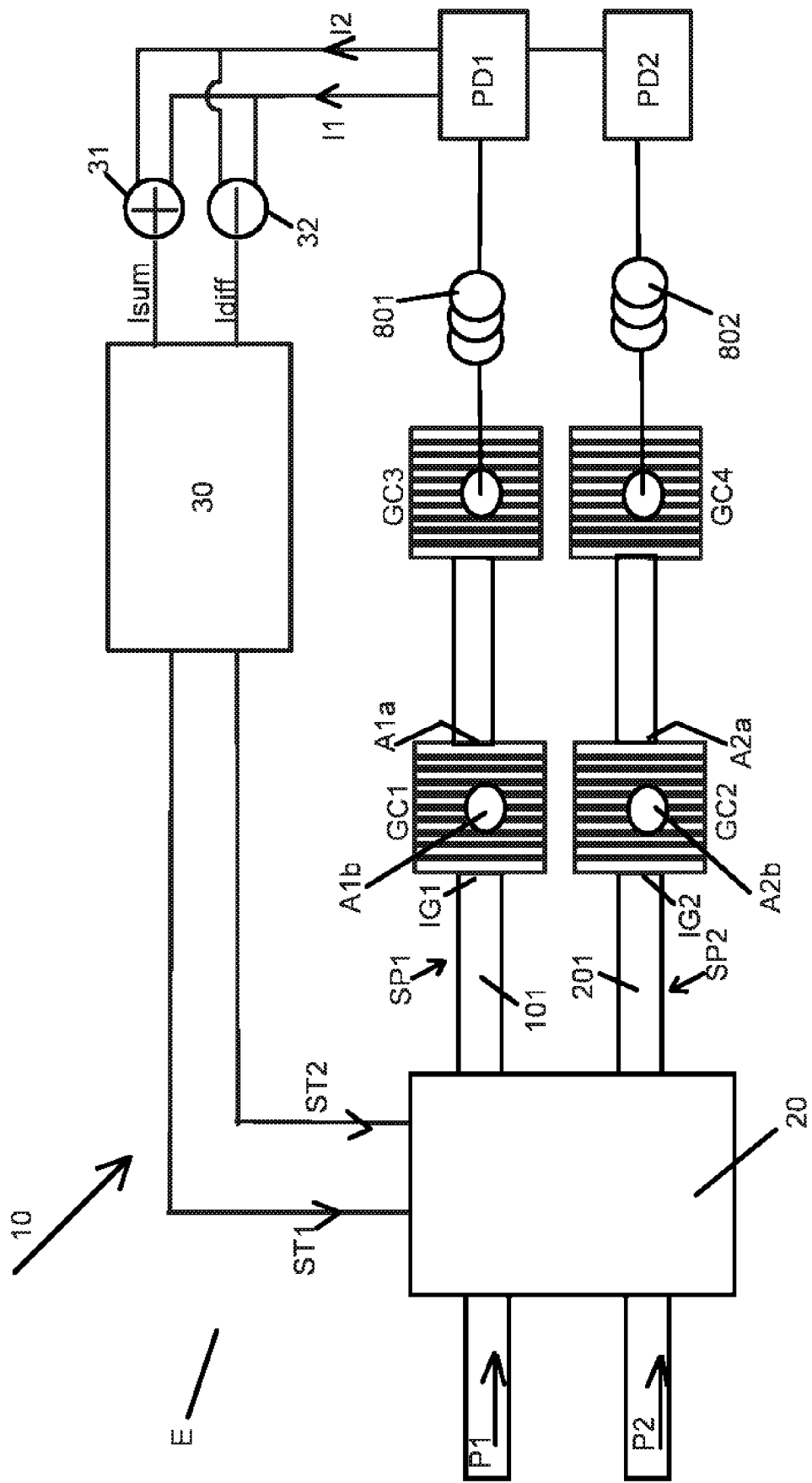
FIG. 8 shows an exemplary embodiment of a photonic component, in which photodetectors are integrated outside the chip plane in which the interference device and the grating couplers are integrated.

FIG. 8 shows an exemplary embodiment of a photonic component 10, in which the two photodetectors PD1 and PD2 are not situated in the chip plane E of the component 10 and not in the image plane according to FIG. 8 but in another chip plane, and thus form external photodetectors. Coupling the optical radiation out of the chip plane E is effected by two further grating couplers GC3 and GC4 in the direction of the external photodetectors PD1 and PD2. The connection between the photodetectors PD1 and PD2 and the assigned grating couplers GC3 and GC4 can be effected for example via external fibers 801 and 802.

Figure 9:
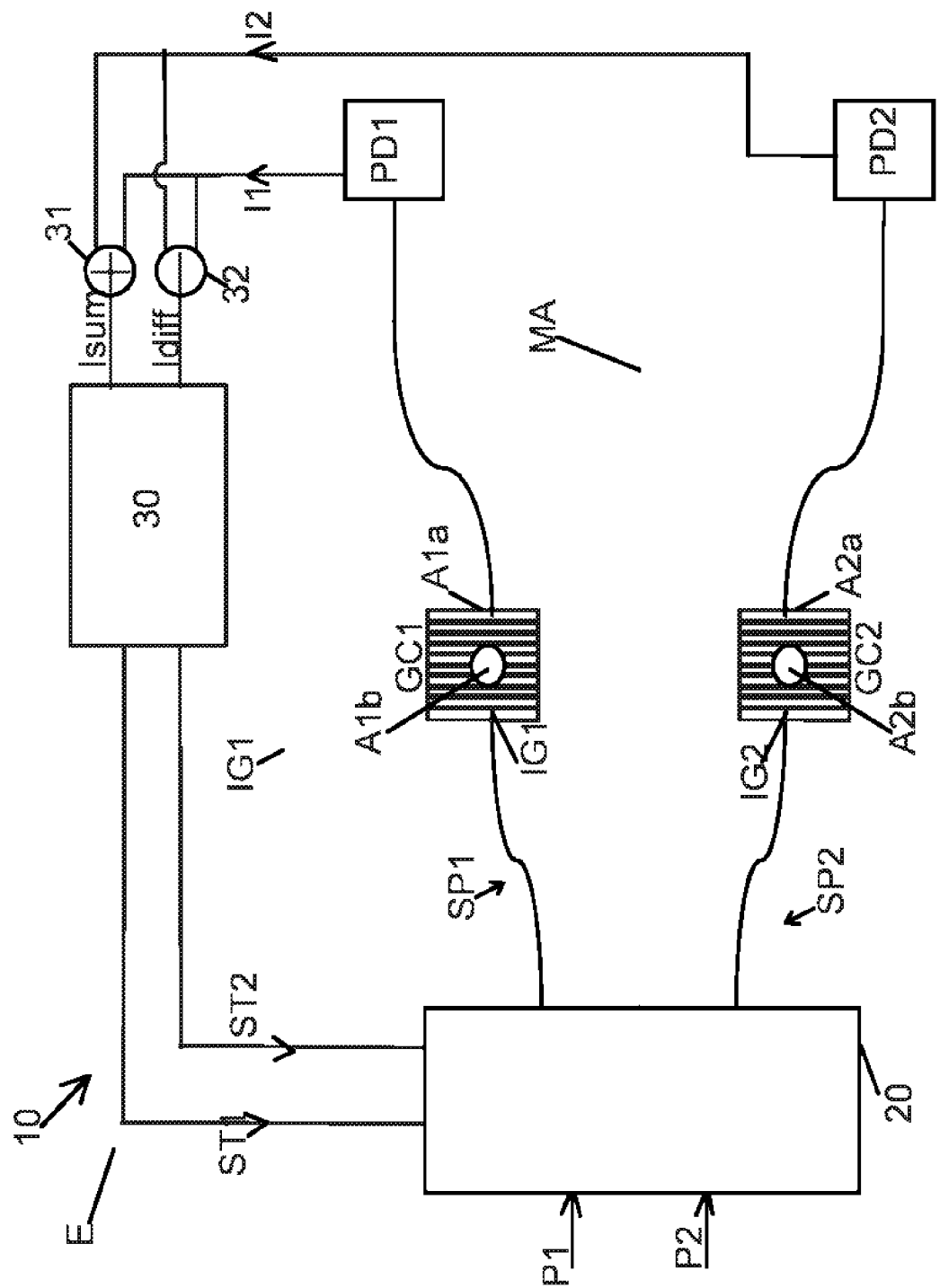
FIG. 9 shows an exemplary embodiment of a photonic component according to the invention, in which two signal paths, which are arranged downstream of the interference device, are not parallel but mirror-symmetric with respect to a mirror axis.

FIG. 9 shows a further exemplary embodiment of an optical component 10, which substantially corresponds to the component of FIG. 1. In contrast to the exemplary embodiment of FIG. 1, the signal paths SP1 and SP2 are not rectilinear but partially curved. In order to ensure that the signal paths SP1 and SP2 optically exhibit the same behavior, the arrangement or the configuration of the two signal paths SP1 and SP2 is axisymmetric with respect to a central axis MA between the two signal paths SP1 and SP2.

Figure 7:
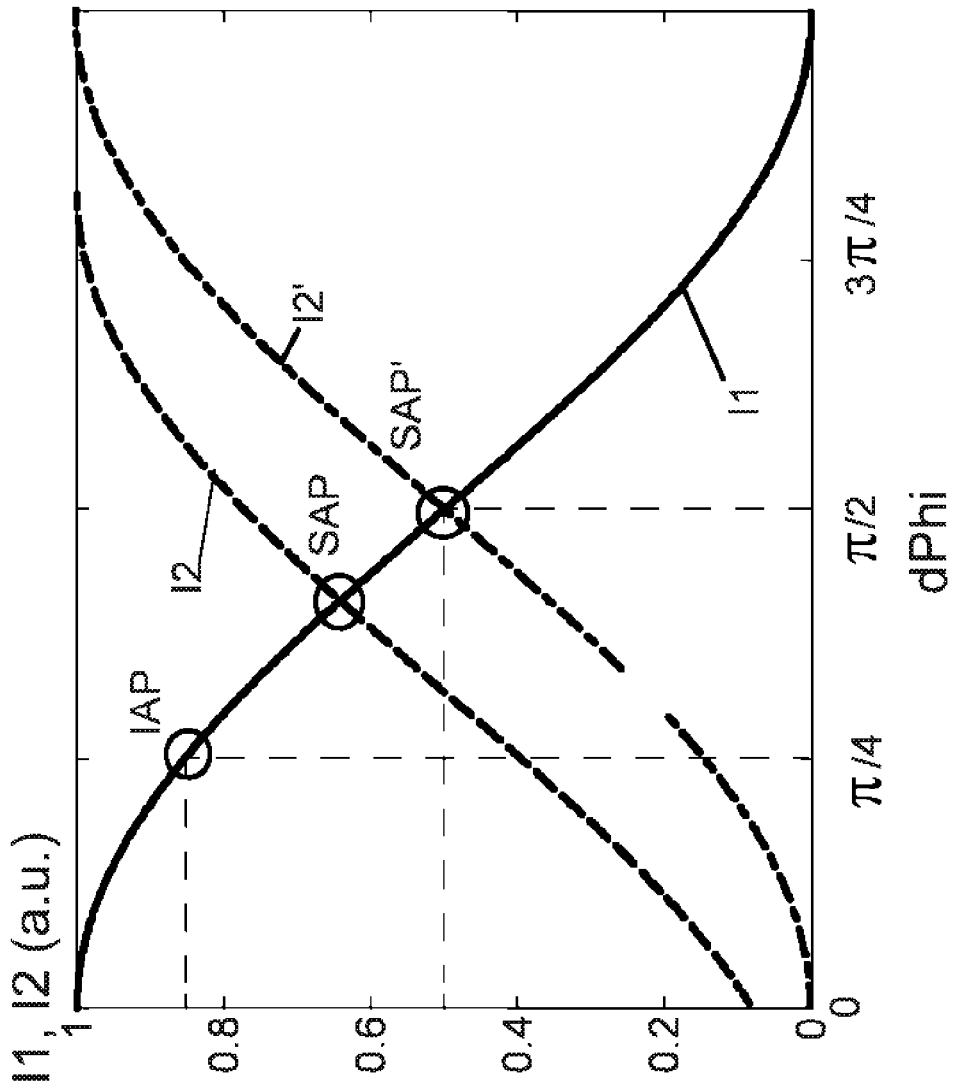
FIG. 7 shows the operating mode of the attenuating elements in the case of the embodiment variant of FIG. 6.
Figure 10:
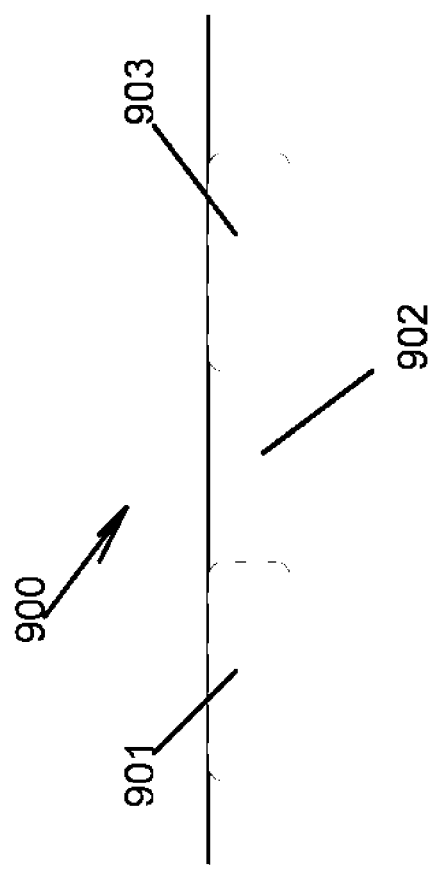
FIG. 10 shows an exemplary embodiment of a charge carrier injection structure, which can be used as an attenuating element in the exemplary embodiment of FIGS. 5 and 6.

FIG. 10 shows a cross section of an exemplary embodiment of a charge carrier injection structure 900, which can be used as an attenuating element 601 and 602 in the exemplary embodiment of FIGS. 5, 6 and 7. The charge carrier injection structure 900 comprises a p-doped region 901, an undoped or weakly doped central region 902, and an n-doped region 903. The optical wave to be attenuated is preferably steered through the central region 902.

By applying a forward voltage to the charge carrier injection structure 900, for example by way of the control device 30 according to FIG. 1, charge carriers can be injected into the central region 902, as a result of which—owing to the charge carrier attenuation—the optical wave that is guided there is attenuated.

Figure 11:
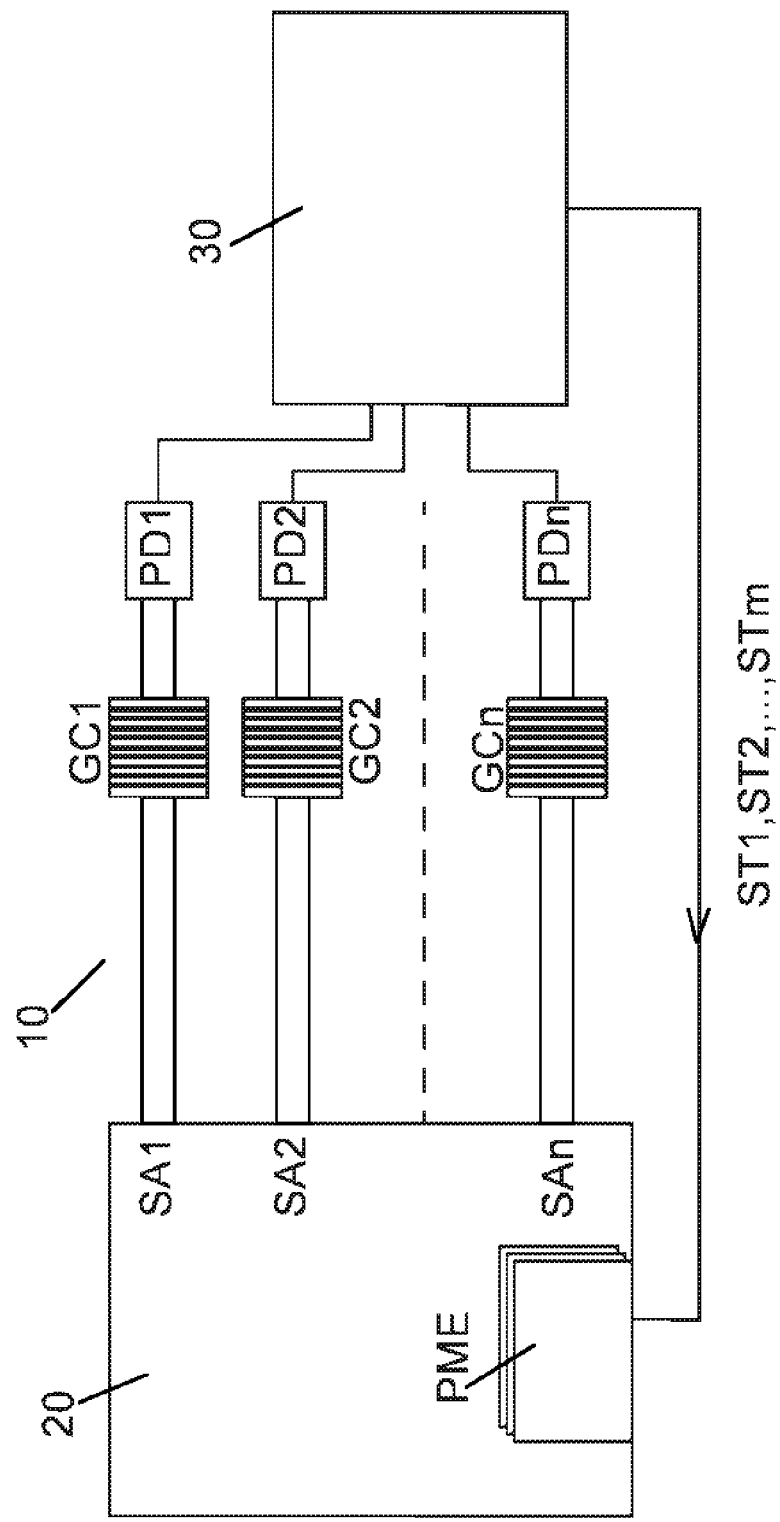
FIG. 11 shows an exemplary embodiment of a photonic component according to the invention having a multiplicity of signal paths.

FIG. 11 shows a photonic component 10 having a multiplicity of signal paths SP1, SP2, . . . , SPn, which each include a photodetector PD1, PD2, . . . , PDn. An interference device 20 of the component has a corresponding number of signal outputs SA1, SA2, . . . , SAn and is provided with a multiplicity m of phase modulators PME, which are controlled by a control device 30 by means of control signals ST1, ST2, . . . , STm. With respect to the control, reference is made to the above statements in connection with FIGS. 1 to 10.

Figure 12:
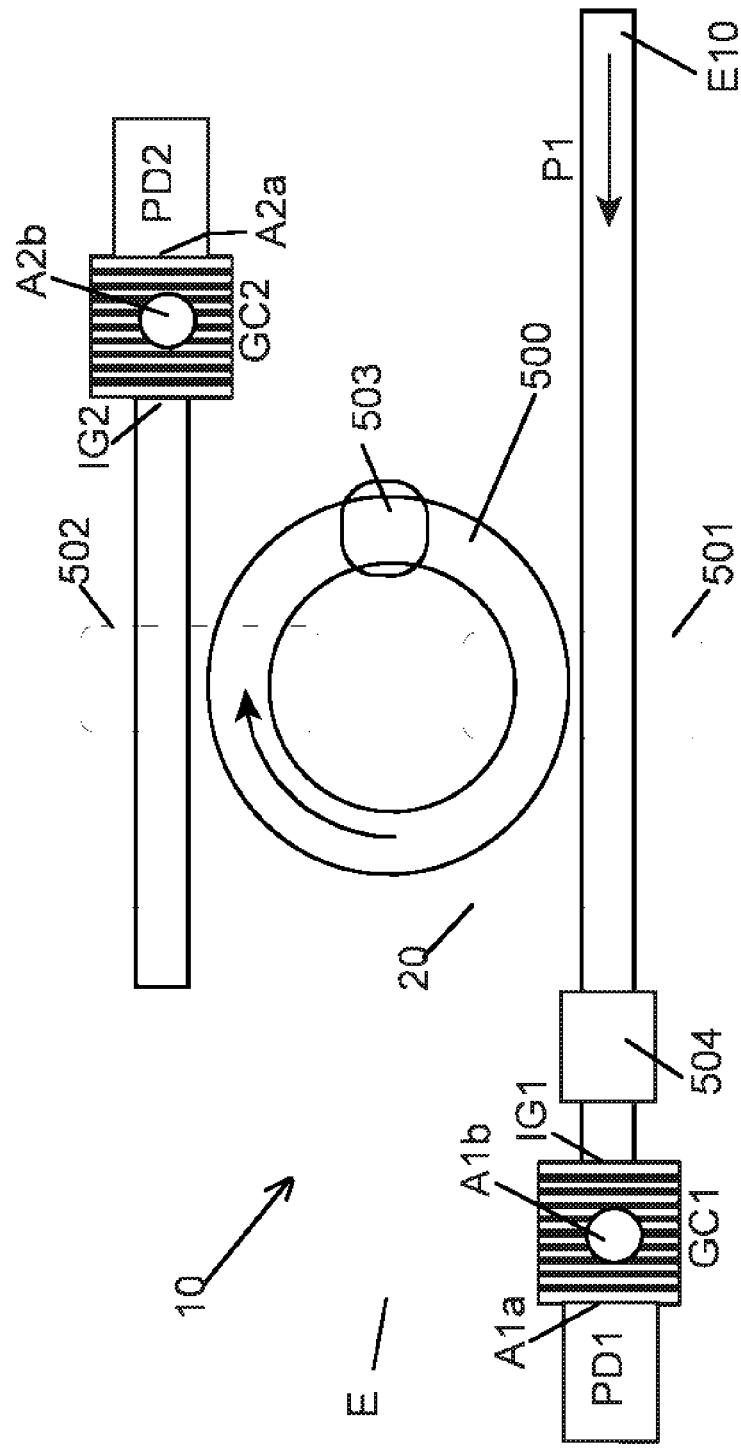
FIG. 12 shows a photonic component, in which photodetectors are directly placed at the first outputs of two grating couplers.

FIG. 12 shows a photonic component 10, which corresponds to the exemplary embodiment of FIG. 5. In contrast to the exemplary embodiment of FIG. 5, the photodetectors PD1 and PD2 are not connected via waveguides, but are placed directly at the first outputs A1a and A2a of the two grating couplers GC1 and GC2. For everything else, the statements made with respect to FIG. 5 correspondly apply to the exemplary embodiment of FIG. 12.

Figure 13:
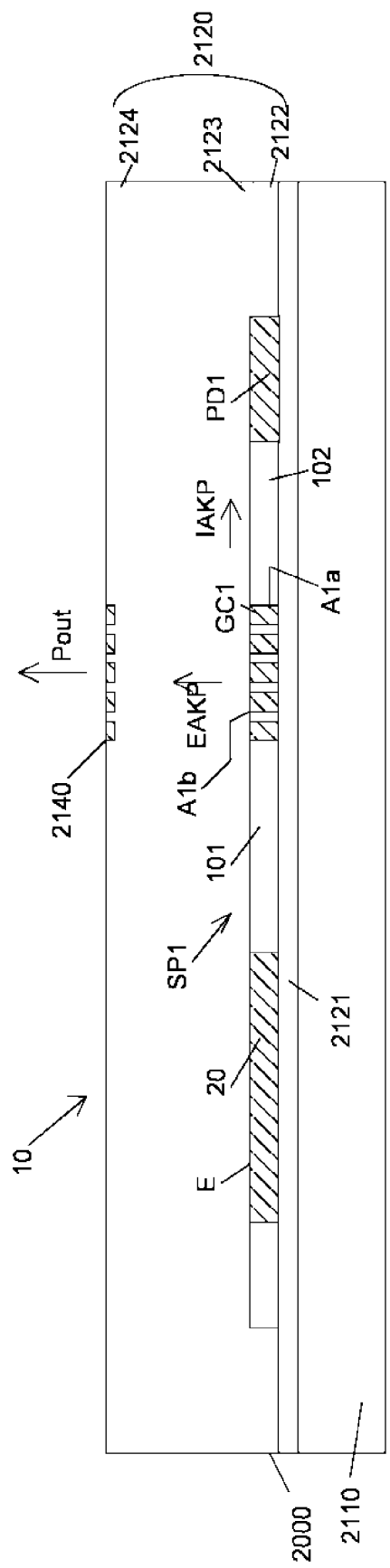
FIG. 13 shows, by way of example, a section of an embodiment variant of the photonic component of FIG. 1 in a cross section.

FIG. 13 shows a preferred embodiment variant of the photonic component 10 of FIG. 1 in a cross section at the location of the first signal path SP1. The chip 2000 of the component 10 comprises a substrate 2110, which may be for example a silicon substrate.

A layer assembly 2120 including a multiplicity of material layers is arranged on the substrate 2110. Integrated in the layer assembly 2120 are the optical waveguides 101 and 102, the grating coupler GC1, a diffraction and refraction structure in the form of a lens 2140 and the photodetector PD1. The optical waveguides 101 and 102, the grating coupler GC1 are integrated in the same layer and thus in the same chip plane E.

The first and lowermost layer of the layer assembly 2120 located on the substrate 2110 is a silicon oxide layer 2121, on which a silicon layer 2122 is situated. At least the waveguides 101 and 102 and the grating coupler GC1 are integrated in the silicon layer 2122. The optical waveguides 101 and 102 can be, for example, what are referred to as SOI rib or strip waveguides, in which the optical radiation is guided in the silicon layer 2122.

The photodetector PD1 can be integrated in modified sections of the silicon layer 2122 and/or in another layer 2123 located on the silicon layer 2122, which can for example be a germanium or silicon-germanium layer.

The lens 2140 is integrated in the uppermost material layer 2124 or at least in one of the upper material layers of the layer assembly 2120. The lens 2140 is thus located—viewed from the substrate 2110—above the waveguiding layer 2122 of the layer assembly 2120 or above the layer into which the grating coupler GC1 and the waveguides 101 and 102 are integrated.

FIG. 13 illustrates that, with the appropriate use of the grating coupler GC1, a, with respect to the chip plane, internal output coupling path IAKP within the chip plane E and a, with respect to the chip plane, external output coupling path EAKP out of the chip plane E are available. For example, this makes it possible to couple out an output signal Pout, which is to leave the component 10 via the signal path PD1, via the external output coupling path EAKP and to perform the monitoring or observation of the output signal by means of the photodetector PD1 via the internal output coupling path IAKP.

Although the invention has been illustrated and described in more detail by preferred exemplary embodiments, the invention is not limited by the examples disclosed, and other variations can be derived therefrom by a person skilled in the art without departing from the scope of protection of the invention.

LIST OF REFERENCE NUMERALS

10 Component
20 Interference device
21 2×2 directional coupler
22 Waveguide
23 Waveguide
24 Directional coupler
30 Control device
31 Adder
32 Subtractor
60 Emitter
70 Emitter
101 Waveguide
102 Waveguide
201 Waveguide
202 Waveguide
401 Power splitter
402 Power splitter
500 Ring resonator
501 Coupler
502 Coupler
503 Phase modulator
504 Attenuating element
601 Attenuating element
602 Attenuating element
801 Fiber
802 Fiber
900 Charge carrier injection structure
901 Region
902 Region
903 Region
2000 Chip
2110 Substrate
2120 Layer assembly
2121 Silicon oxide layer
2122 Silicon layer
2123 Layer
2124 Uppermost material layer
2140 Lens
A1a Grating coupler output
A1b Grating coupler output
A2a Grating coupler output
A2b Grating coupler output
A20a Output
A20b Output
A21a Output
A21b Output
E Chip plane
E10 Signal input
E20 Input
E21a Input
E21b Input
E24a Input
E24b Input
EAKP External output coupling path
GC1 Grating coupler
GC2 Grating coupler
GC3 Grating coupler
GC4 Grating coupler
GCn Grating coupler
H1 Phase shifter
H2 Phase shifter
I1 Photocurrent or photo signal
I2 Photo signal
I2' Shifted photo signal
IAP Instantaneous operating point
IAKP Internal output coupling path
Idiff Difference signal
Isum Sum signal
IG1 Grating coupler input
IG2 Grating coupler input
MA Central axis
MZM1 Mach-Zehnder modulator
MZM2 Mach-Zehnder modulator
P1 Signal P2 Signal
PD1 Photodetector
PD2 Photodetector
PDn Photodetector
PME Phase modulator
Pout Output signal
PS1 Modulator
PS2 Modulator
SA1 Signal output
SA2 Signal output
SAn Signal output
SAP Target operating point
SAP' Target operating point
SP1 Signal path
SP2 Signal path
Spn Signal path
ST1 Control signal
ST2 Control signal
STm Control signal

The invention claimed is:

1. A photonic component (10) with an interference device (20), which has at least one input and at least one first and one second output, characterized in that the component (10) comprises moreover:
a first grating coupler (GC1) which has a first and a second grating coupler output and is connected, by way of a grating coupler input, to the first output of the interference device (20),
a second grating coupler (GC2) which has a first and a second grating coupler output and is connected, by way of a grating coupler input, to the second output of the interference device (20),
a first photodetector (PD1), connected to the first grating coupler output of the first grating coupler (GC1),
a second photodetector (PD2), connected to the first grating coupler output of the second grating coupler (GC2), and
a control device (30), which is connected to the first and second photodetectors (PD1, PD2) and forms at least one control signal (ST1, ST2) for controlling the interference device (20) on the basis of the photo signals (I1, I2) of the two photodetectors (PD1, PD2) or an evaluation signal formed with the photo signals (I1, I2),
wherein the first and second grating couplers (GC1, GC2) are arranged, in particular integrated, in the same chip plane (E) of a chip (2000) of the component (10), and
wherein, in the case of the first and second grating couplers (GC1, GC2), in each case the second grating coupler outputs form in each case a coupling path out of the chip plane (E), specifically at an angle between 70 and 110 degrees with respect to the chip plane (E),
wherein the interference device (20) further comprises an output-side directional coupler (24) having two inputs and two outputs;
wherein the first grating coupler (GC1) is connected to the first output of the output-side directional coupler (24),
wherein the second grating coupler (GC2) is connected to the second output of the output-side directional coupler (24),
wherein the interference device (20) further comprises an input-side coupler or splitter (21) having two inputs and two outputs,
wherein each one of the two waveguides is connected to one of the two outputs of the input-side directional coupler or splitter (21),
wherein the two waveguides connect the input-side directional coupler or splitter (21) to the two inputs of the output-side directional coupler (24), and
wherein at least one of the two waveguides is provided with a phase modulator or phase shifter (H1, H2) that is controlled by the control device (30).

2. The photonic component (10) as claimed in claim 1, characterized in that the interference device (20) is arranged or integrated in the chip plane (E) of the chip (2000).

3. The photonic component (10) as claimed in claim 1, characterized in that at least one waveguide (101, 102, 201, 202) which is arranged or integrated in the chip plane (E) of the chip (2000) of the component (10)
connects the first output of the interference device (20) to the grating coupler input of the first grating coupler (GC1),
connects the second output of the interference device (20) to the grating coupler input of the second grating coupler (GC2),
connects the first grating coupler output of the first grating coupler (GC1) to the first photodetector (PD1), or
connects the first grating coupler output of the second grating coupler (GC2) to the second photodetector (PD2).

4. The photonic component (10) as claimed in claim 1, characterized in that the first and second photodetectors (PD1, PD2) and the first and second grating couplers (GC1, GC2) are arranged, in particular integrated, in the same chip plane (E) of the chip (2000) of the component (10).

5. The photonic component (10) as claimed in claim 1, characterized in that at least one of the photodetectors (PD1, PD2) or both photodetectors (PD1, PD2) are arranged outside the chip plane (E) of the chip (2000).

6. The photonic component (10) as claimed in claim 5, characterized in that a further coupler (GC3, GC4) is arranged between the photodetector (PD1, PD2) that is arranged outside the chip plane (E) of the chip (2000) and the grating coupler (GC1, GC2) that is connected thereto, in particular a further coupler which is arranged in the chip plane (E) and whose coupler output forms a coupling path out of the chip plane (E), specifically at an angle between 70 and 110 degrees with respect to the chip plane (E).

7. The photonic component (10) as claimed in claim 1, characterized in that the component (10) includes an adder (31) which forms, as an evaluation signal, a sum signal by adding together the two photo signals (I1, I2).

8. The photonic component (10) as claimed in claim 1, characterized in that the component (10) includes a subtractor (32) which forms, as an evaluation signal, a difference signal by subtracting one of the two photo signals from the other of the two photo signals.

9. The photonic component (10) as claimed in claim 1, characterized in that the interference device (20) includes at least one Mach-Zehnder modulator (MZM1, MZM2).

10. The photonic component (10) as claimed in claim 9, wherein
the Mach-Zehnder modulator includes, on the input side, a 2×2 directional coupler (21) having two inputs and two outputs, or a 1×2 splitter having one input and two outputs,
the input of the input-side 1×2 splitter or the two inputs of the input-side directional coupler form the input or the two inputs of the interference device (20).

11. The photonic component (10) as claimed in claim 1, wherein the interference device (20) includes at least two Mach-Zehnder modulators.

12. The photonic component (10) as claimed in claim 11, wherein the Mach-Zehnder modulators are optically connected in parallel by means of an input-side power splitter, and by means of an output-side power splitter.

13. The photonic component (10) as claimed in claim 1, characterized in that at least one attenuating element (504, 601, 602) is connected into the signal path (SP1) between the first output of the interference device (20) and the first photodetector (PD1), or into the signal path (SP2) between the second output of the interference device (20) and the second photodetector (PD2).

14. The photonic component (10) as claimed in claim 13, characterized in that the attenuating element (504, 601, 602) is settable and connected to the control device (30) and is controlled thereby.

15. The photonic component (10) as claimed in claim 14, characterized in that the control device (30) controls the interference device (20) and the attenuating element (504, 601, 602) such that an optical signal, which exits at the second grating coupler output of the first grating coupler (GC1) and is at least also amplitude-modulated by the interference device (20), attains a specified on-off ratio.

16. The photonic component (10) as claimed in claim 14, characterized in that the control device (30) sets the attenuating element (504, 601, 602) such that the optical path attenuation in the signal path (SP1) between the first output of the interference device (20) and the first photodetector (PD1) and the optical path attenuation in the signal path (SP2) between the second output of the interference device (20) and the second photodetector (PD2) are of the same magnitude or at least deviate from one another by less than a specified extent.

17. The photonic component (10) as claimed in claim 14, characterized in that the attenuating element (504, 601, 602) has a charge carrier injection structure (900), in particular a p-n or pin diode structure for charge carrier injection.

18. The photonic component (10) as claimed in claim 1, characterized in that the optical signal path (SP1) between the first output of the interference device (20) and the first photodetector (PD1) and the optical signal path (SP2) between the second output of the interference device (20) and the second photodetector (PD2) are arranged axisymmetrically with respect to one another.

19. The photonic component (10) as claimed in claim 1, characterized in that the signal path (SP1) between the first output of the interference device (20) and the first photodetector (PD1) and the signal path (SP2) between the second output of the interference device (20) and the second photodetector (PD2) have the same path attenuation, and in particular consist of elements of the same construction, which are identical or symmetrically arranged with respect to one another.

20. The photonic component (10) as claimed in claim 1, characterized in that, in the chip plane (E), the maximum distance between the first signal path (SP1), which is formed between the first output of the interference device (20) and the first photodetector (PD1), and the second signal path (SP2), which is formed between the second output of the interference device (20) and the second photodetector (PD2), is less than 100 μm.

21. The photonic component (10) as claimed in claim 1, characterized in that the control device (30) is integrated monolithically in the chip (2000).

22. The photonic component (10) as claimed in claim 1, characterized in that the first and second grating couplers (GC1, GC2) have the same construction.

23. The photonic component (10) as claimed in claim 1, characterized in that at least the second grating coupler output of the first grating coupler (GC1) forms an optical signal output of the photonic component (10).

24. A method for operating a photonic component (10), characterized in that a component (10) as claimed in claim 1 is operated as a photonic component (10), wherein the control device (30) controls at least the interference device (20).

\* \* \* \* \*